United States Patent
Moulieres et al.

(10) Patent No.: US 10,287,948 B1
(45) Date of Patent: May 14, 2019

(54) HIGH EFFICIENCY MIXER FOR VEHICLE EXHAUST SYSTEM

(71) Applicant: Faurecia Emissions Control Technologies, USA, LLC, Columbus, IN (US)

(72) Inventors: Julien Moulieres, Montbéliard (FR); Eduardo Alano, Columbus, IN (US); Laurent Poinsot, Montbéliard (FR)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 15/959,545

(22) Filed: Apr. 23, 2018

(51) Int. Cl.
*B01D 53/94* (2006.01)
*F01N 3/20* (2006.01)
(Continued)

(52) U.S. Cl.
CPC ......... *F01N 3/208* (2013.01); *B01D 46/0027* (2013.01); *B01D 53/944* (2013.01); *B01D 53/9418* (2013.01); *B01D 53/9431* (2013.01); *B01D 53/9477* (2013.01); *B01F 3/04049* (2013.01); *B01F 5/0473* (2013.01); *B01F 5/0606* (2013.01); *B01F 5/0688* (2013.01);
(Continued)

(58) Field of Classification Search
None
See application file for complete search history.

(56) References Cited

U.S. PATENT DOCUMENTS

| | | | |
|---|---|---|---|
| 4,033,123 | A | 7/1977 | Masaki et al. |
| 4,459,805 | A | 7/1984 | Kamiya et al. |

(Continued)

FOREIGN PATENT DOCUMENTS

| | | |
|---|---|---|
| CN | 202012386 U | 10/2011 |
| CN | 103321724 A | 9/2013 |

(Continued)

OTHER PUBLICATIONS

Proventia Emisson Control Oy, Proventia SuperTomado, Urea Mixing Technology, 2016.
(Continued)

*Primary Examiner* — Walter D. Griffin
*Assistant Examiner* — Jelitza M Perez
(74) *Attorney, Agent, or Firm* — Carlson, Gaskey & Olds, P.C.

(57) ABSTRACT

A vehicle exhaust component assembly includes an inlet module configured to receive engine exhaust gas, a mixer housing defining an internal cavity that receives engine exhaust gas from the inlet module, and an injection component defining an injection axis and positioned within the internal cavity. The injection component has a fluid inlet and a fluid outlet to direct injected fluid into the internal cavity to mix with the engine exhaust gas. The injection component comprises at least a first curved sheet and a second curved sheet that cooperate with each other to surround the injection axis, wherein the second curved sheet is offset from the first curved sheet by a radial gap to create a swirling gas flow within the injection component to mix with fluid injected via the fluid inlet. An outlet module directs a mixture of engine exhaust gas and fluid to a downstream exhaust component.

26 Claims, 12 Drawing Sheets

(51) Int. Cl.
  *F01N 3/10* (2006.01)
  *B01F 5/06* (2006.01)
  *B01F 5/04* (2006.01)
  *B01F 3/04* (2006.01)
  *B01D 46/00* (2006.01)
  *F01N 3/021* (2006.01)
  *B01F 5/00* (2006.01)

(52) U.S. Cl.
  CPC ............ *F01N 3/021* (2013.01); *F01N 3/106* (2013.01); *B01D 2279/30* (2013.01); *B01F 2005/0017* (2013.01); *F01N 2610/02* (2013.01); *F01N 2610/08* (2013.01); *F01N 2610/1406* (2013.01)

(56) References Cited

U.S. PATENT DOCUMENTS

| | | |
|---|---|---|
| 4,662,172 A | 5/1987 | Shinzawa et al. |
| 4,912,920 A | 4/1990 | Hirabayashi |
| 5,020,991 A | 6/1991 | Schaale et al. |
| 5,826,428 A | 10/1998 | Blaschke |
| 6,192,677 B1 | 2/2001 | Tost |
| 6,382,600 B1 | 5/2002 | Mahr |
| 6,401,455 B1 | 6/2002 | Mathes et al. |
| 6,449,947 B1 | 9/2002 | Liu et al. |
| 6,527,865 B1 | 3/2003 | Sajoto et al. |
| 6,539,708 B1 | 4/2003 | Hofmann et al. |
| 7,059,118 B2 | 6/2006 | Ripper et al. |
| 7,849,676 B2 | 12/2010 | Witte-Merl |
| 7,877,983 B2 | 2/2011 | Kunkel et al. |
| 7,878,298 B2 | 2/2011 | Winter et al. |
| 7,963,104 B2 | 6/2011 | Girard et al. |
| 7,980,063 B2 | 7/2011 | Cooke |
| 8,097,055 B2 | 1/2012 | Staley et al. |
| 8,114,364 B2 | 2/2012 | Harinath et al. |
| 8,375,703 B2 | 2/2013 | Hayashi et al. |
| 8,438,839 B2 | 5/2013 | Floyd et al. |
| 8,539,761 B2 | 9/2013 | Lebas et al. |
| 8,646,258 B2 | 2/2014 | Vanvolsem et al. |
| 8,756,921 B2 | 6/2014 | Troxler et al. |
| 8,776,509 B2 | 7/2014 | Wikaryasz et al. |
| 8,966,884 B2 | 3/2015 | Kruse et al. |
| 9,057,312 B2 | 6/2015 | Munnannur et al. |
| 9,062,582 B2 | 6/2015 | Loman et al. |
| 9,103,258 B2 | 8/2015 | Norling et al. |
| 9,140,163 B2 | 9/2015 | Loman |
| 9,266,075 B2 | 2/2016 | Chapman et al. |
| 9,341,100 B2 | 5/2016 | Petry |
| 9,346,017 B2 | 5/2016 | Greber |
| 9,464,546 B2 | 10/2016 | Perrot et al. |
| 9,581,067 B2 | 2/2017 | Guilbaud et al. |
| 9,719,397 B2 | 8/2017 | Alano et al. |
| 9,873,084 B2 | 1/2018 | Lee et al. |
| 2001/0018826 A1 | 9/2001 | Rusch |
| 2004/0047232 A1 | 3/2004 | Terentiev |
| 2005/0150211 A1 | 7/2005 | Crawley et al. |
| 2007/0163241 A1 | 7/2007 | Meingast et al. |
| 2007/0175204 A1 | 8/2007 | Shirai et al. |
| 2009/0031714 A1 | 2/2009 | Jochumsen et al. |
| 2009/0064668 A1 | 3/2009 | Herrick et al. |
| 2009/0084094 A1 | 4/2009 | Goss et al. |
| 2009/0107126 A1 | 4/2009 | Bugos et al. |
| 2009/0249769 A1 | 10/2009 | Flanagan et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0257849 A1 | 10/2010 | Kowada |
| 2010/0300080 A1 | 12/2010 | Peters et al. |
| 2010/0307138 A1 | 12/2010 | Chen |
| 2010/0319329 A1 | 12/2010 | Khadiya |
| 2011/0094206 A1 | 4/2011 | Liu et al. |
| 2011/0131958 A1 | 6/2011 | Adelman et al. |
| 2011/0162347 A1 | 7/2011 | Katare et al. |
| 2011/0239631 A1 | 10/2011 | Bui et al. |
| 2011/0308234 A1 | 12/2011 | De Rudder et al. |
| 2012/0144812 A1 | 6/2012 | Hyun |
| 2012/0204541 A1 | 8/2012 | Li et al. |
| 2012/0216513 A1 | 8/2012 | Greber et al. |
| 2013/0216442 A1 | 8/2013 | Brunel et al. |
| 2013/0263575 A1 | 10/2013 | Sun |
| 2013/0291519 A1 | 11/2013 | Patel et al. |
| 2013/0303365 A1 | 11/2013 | Yin et al. |
| 2014/0086802 A1 | 3/2014 | Werni et al. |
| 2014/0318112 A1 | 10/2014 | Solbrig et al. |
| 2014/0334988 A1 | 11/2014 | Stanavich et al. |
| 2014/0345257 A1 | 11/2014 | Levin et al. |
| 2015/0020484 A1* | 1/2015 | Kimura ................ B01F 5/0065 55/459.1 |
| 2015/0071828 A1 | 3/2015 | Sampath et al. |
| 2015/0152766 A1 | 6/2015 | Brunel |
| 2015/0167520 A1 | 6/2015 | Niaz |
| 2015/0273411 A1 | 10/2015 | Chapman et al. |
| 2016/0084133 A1 | 3/2016 | Sampath et al. |
| 2016/0115847 A1 | 4/2016 | Chapman et al. |
| 2016/0138454 A1 | 5/2016 | Alano et al. |
| 2016/0184783 A1* | 6/2016 | Tyni ..................... B01F 5/0065 422/169 |
| 2016/0215673 A1 | 7/2016 | Noren, IV et al. |
| 2016/0251990 A1 | 9/2016 | Dimpelfeld et al. |
| 2016/0317986 A1 | 11/2016 | Alano |
| 2016/0319720 A1 | 11/2016 | Alano |
| 2016/0319723 A1 | 11/2016 | Alano et al. |
| 2016/0319724 A1 | 11/2016 | Alano et al. |
| 2016/0332126 A1 | 11/2016 | Nande et al. |
| 2017/0022870 A1 | 1/2017 | Chapman et al. |
| 2017/0066012 A1 | 3/2017 | Hornback et al. |
| 2017/0082007 A1 | 3/2017 | Alano et al. |
| 2017/0107877 A1 | 4/2017 | Johnson et al. |
| 2017/0167344 A1 | 6/2017 | Alano et al. |

FOREIGN PATENT DOCUMENTS

| | | |
|---|---|---|
| CN | 203452874 U | 2/2014 |
| CN | 104594990 A | 5/2015 |
| CN | 104832255 A | 8/2015 |
| CN | 104832256 A | 8/2015 |
| CN | 204646380 U | 9/2015 |
| CN | 204646381 U | 9/2015 |
| CN | 205164443 U | 4/2016 |
| CN | 106014560 A | 10/2016 |
| CN | 205627632 U | 10/2016 |
| CN | 107084028 A | 8/2017 |
| CN | 206487537 U | 9/2017 |
| DE | 102007034316 A1 | 1/2009 |
| DE | 102007051510 A1 | 4/2009 |
| DE | 102008008564 A1 | 8/2009 |
| DE | 102011077156 A1 | 12/2012 |
| DE | 102012209689 A1 | 12/2013 |
| DE | 102011075594 A1 | 9/2016 |
| EP | 1596044 A1 | 11/2005 |
| EP | 2492465 A1 | 1/2012 |
| EP | 2551481 A1 | 6/2012 |
| FR | 2910533 A1 | 6/2008 |
| FR | 3007068 A3 | 12/2014 |
| GB | 174131 A | 1/1922 |
| GB | 1215148 A | 12/1970 |
| JP | H04365303 A | 12/1992 |
| JP | H11159320 A | 6/1999 |
| JP | 2001030093 A | 2/2001 |
| JP | 2004339991 A | 12/2004 |
| JP | 2005214175 A | 8/2005 |
| JP | 2006017043 A | 1/2006 |
| JP | 2006167576 A | 6/2006 |
| JP | 5066435 B2 | 11/2012 |
| JP | 2016075205 A | 5/2016 |
| JP | 2016188579 A | 11/2016 |
| KR | 20090105593 A | 10/2009 |
| KR | 102011049152 A | 5/2011 |
| KR | 1020120053494 A | 5/2011 |
| KR | 20140002326 A | 1/2014 |
| WO | 2004113690 A1 | 12/2004 |
| WO | 2009098096 A1 | 8/2009 |
| WO | 2009127449 A1 | 10/2009 |

(56) References Cited

FOREIGN PATENT DOCUMENTS

| WO | 2011110885 A1 | 9/2011 | |
|---|---|---|---|
| WO | 2013004517 A2 | 1/2013 | |
| WO | 2013010700 A1 | 1/2013 | |
| WO | 2014098728 A1 | 6/2014 | |
| WO | 2015018849 A1 | 2/2015 | |
| WO | 2016036298 A1 | 3/2016 | |
| WO | 2016158993 A1 | 10/2016 | |
| WO | 2016180244 A1 | 11/2016 | |
| WO | 2016207484 A1 | 12/2016 | |
| WO | WO-2016207484 A1 * | 12/2016 | ............ B01F 5/0065 |

OTHER PUBLICATIONS

International Preliminary Report on Patentability for PCT Application No. PCT/US2012/057693, dated Apr. 9, 2015.
PCT/US2017/035130 Application, filed on May 31, 2017.
International Preliminary Report on Patentability for PCT Application No. PCT/US2012/057768, dated Apr. 9, 2015.
International Search Report and Written Opinion for PCT Application No. PCT/US2017/049805, dated Jan. 29, 2018.
International Search Report and Written Opinion for PCT Application No. PCT/US2017/035130, dated Feb. 22, 2018.
International Search Report and Written Opinion for PCT Application No. PCT/US2014/010989, dated Oct. 15, 2014.
PCT/US2013/051935 application, filed Jul. 25, 2013.
International Search Report and Written Opinion for International Application No. PCT/US2016/028229 dated Jul. 28, 2016.
International Search Report and Written Opinion for International Application No. PCT/US2016/028237 dated Jul. 28, 2016.
International Preliminary Report on Patentability for International Application No. PCT/US2014/015241 dated Aug. 18, 2016.
International Search Report and Written Opinion for International Application No. PCT/US2014/041013 dated Feb. 15, 2015.
International Search Report and Written Opinion for PCT Application No. PCT/US2014/040588, dated Feb. 6, 2015.
PCT/US14/10989 application, filed Jan. 10, 2014.
PCT/US17/49805 application, filed Sep. 1, 2017.
PCT/US17/59874 application, filed Nov. 3, 2017.
PCT/US18/12865 application, filed Jan. 9, 2018.
PCT/US14/15241 application, filed Feb. 7, 2014.
PCT/US14/41013 application, filed Jun. 5, 2014.
PCT/US14/40588 application, filed Jun. 3, 2014.

* cited by examiner

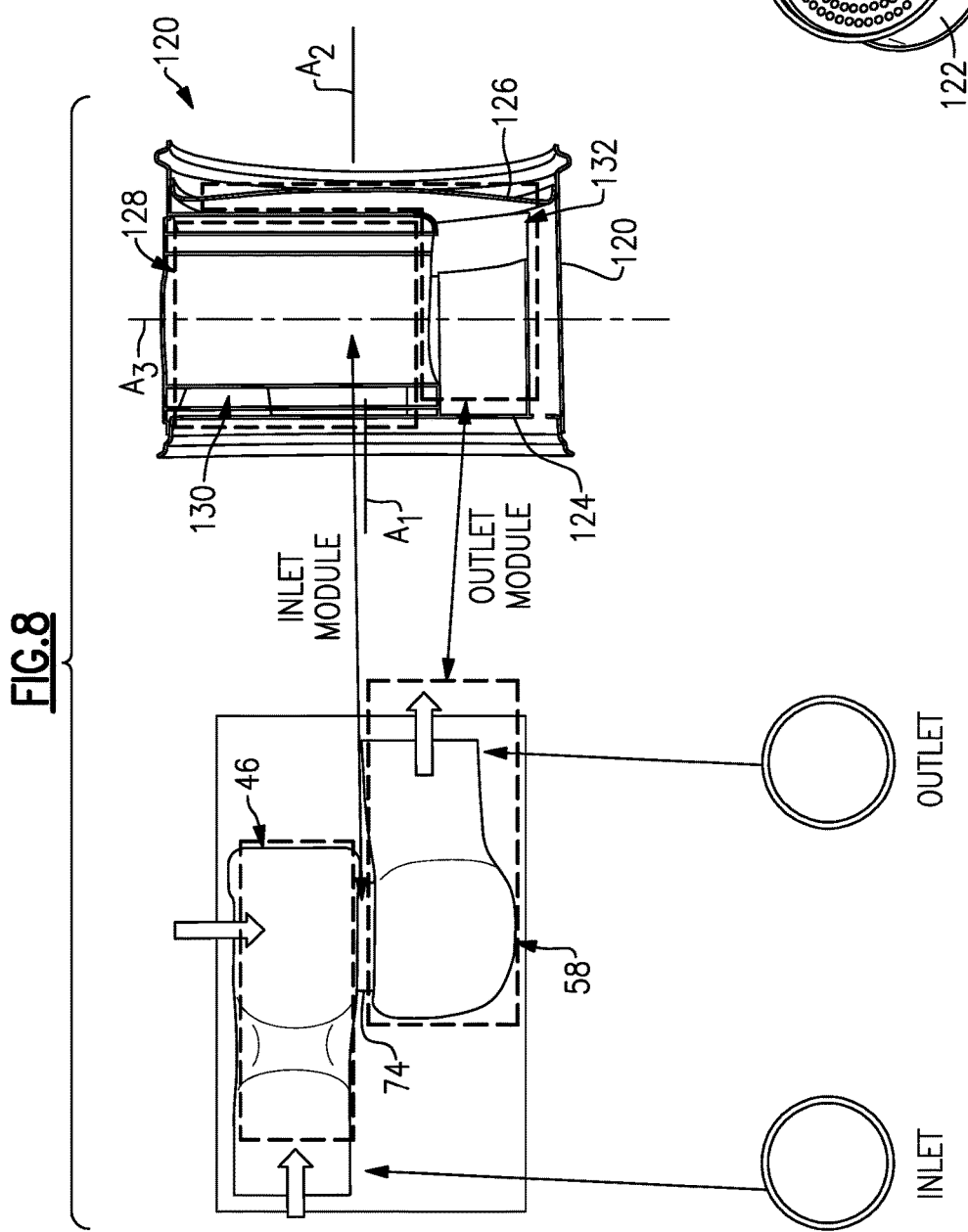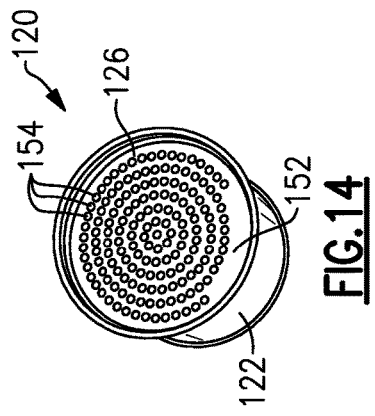

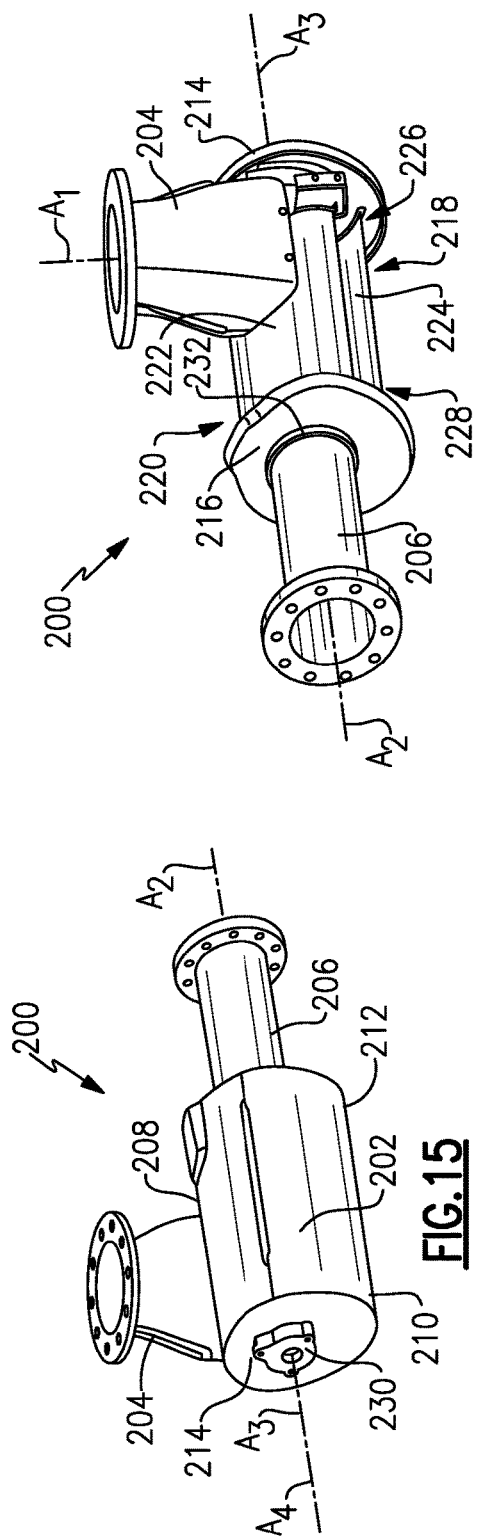
FIG.16
FIG.15
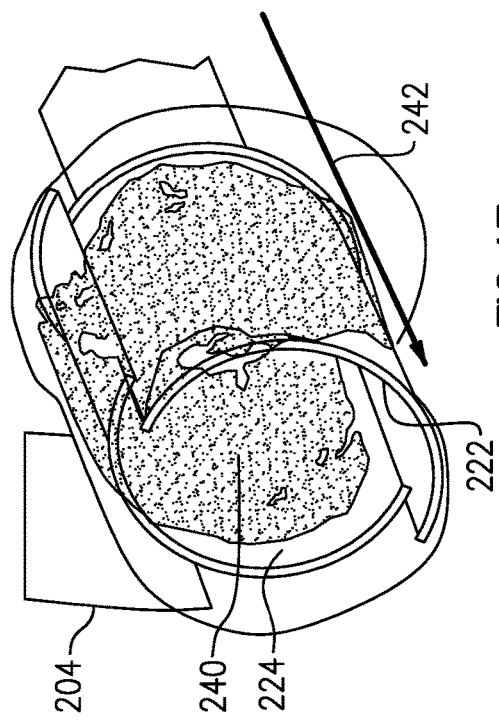
FIG.17

HIGH EFFICIENCY MIXER FOR VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or any reducing agent such as a solution of urea and water for example, upstream of a selective catalytic reduction (SCR) catalyst. In one example, a mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. For example, there may be a lower ammonia uniformity index, there may be an increased pressure drop across the mixer, or higher ammonia emissions during active diesel particulate filter (DPF) regeneration.

Additionally, mixers are being used in a wide variety of applications that have different mounting configurations. Providing a different mixer for each configuration raises cost. Having a mixer principle that addresses the issues set forth above in combination with a mixer assembly that can be easily adjusted to multiple different mounting arrangements would significantly reduce cost.

SUMMARY OF THE INVENTION

In one exemplary embodiment, a vehicle exhaust component assembly includes an inlet module configured to receive engine exhaust gas, a mixer housing defining an internal cavity that receives engine exhaust gas from the inlet module, and an injection component defining an injection axis and positioned within the internal cavity. The injection component has a fluid inlet and a fluid outlet to direct injected fluid into the internal cavity to mix with the engine exhaust gas. The injection component comprises at least a first curved sheet and a second curved sheet that cooperate with each other to surround the injection axis, and wherein the second curved sheet is offset from said first curved sheet by a radial gap to create a swirling gas flow within the injection component to mix with fluid injected via the fluid inlet. An outlet module directs a mixture of engine exhaust gas and fluid to a downstream exhaust component.

In a further embodiment of the above, the first curved sheet comprises a first curved body that extends at least partially about the injection axis from a first longitudinally extending edge to a second longitudinally extending edge, and wherein the second curved sheet comprises a second curved body that extends at least partially about the injection axis from a third longitudinally extending edge to a fourth longitudinally extending edge, and wherein the first and third longitudinally extending edges are radially spaced apart from each other in an overlapping relationship on one side of the injection axis and the second and fourth longitudinally extending edges are radially spaced apart from each other in an overlapping relationship on an opposite side of the injection axis.

In another exemplary embodiment, the first longitudinally extending edges of the first and second curved sheets are in radial alignment with each other and radially spaced apart from each other on one side of the injection axis, and wherein the second longitudinally extending edges of the first and second curved sheets are in radial alignment and are radially spaced apart from each other on an opposite side of the injection axis.

In another exemplary embodiment, a vehicle exhaust component assembly includes an inlet, a mixer housing receiving engine exhaust gas from the inlet, and an injector to inject fluid into the mixer housing along an injection axis. The injector includes at least first and second curved sheets that cooperate with each other to surround the injection axis, wherein each curved sheet has first and second circumferentially extending edges that are axially spaced apart from each other and first and second longitudinally extending edges that connect the first and second circumferentially extending edges to each other. The first and second longitudinally extending edges of the first curved sheet are radially offset from the first and second longitudinally extending edges of the second curved sheet. An outlet directs a mixture of engine exhaust gas and fluid to a downstream exhaust component.

In another exemplary embodiment, a vehicle exhaust component assembly includes an inlet and a mixer device configured to receive engine exhaust gas from the inlet, wherein the mixer device includes an injector opening that defines an injection axis. At least first and second C-shaped sheets that cooperate with each other to surround the injection axis, and wherein the second C-shaped is radially offset from the first C-shaped sheet to provide a swirling mixing area between the first and second C-shaped sheets for injected fluid to mix with the engine exhaust gas. An outlet directs a mixture of engine exhaust gas and injected fluid to a downstream exhaust component.

In a further embodiment of any of the above, the mixer device includes an outer housing defining a mixer central axis and extending from an upstream end to a downstream end, and the assembly further includes an inlet baffle plate at the upstream end, an outlet baffle plate at the downstream end, and an inlet manifold positioned between the inlet and outlet baffle plates, and wherein the first and second C-shaped sheets are positioned between the inlet baffle plate and the inlet manifold such that the injection axis is non-parallel with the mixer central axis.

In a further embodiment of any of the above, the mixer device includes an outer housing defining a central axis and extending from an upstream end to a downstream end, and the assembly further includes an inlet flange with the injector opening at the upstream end, an outlet flange at the downstream end, and wherein the first and second C-shaped sheets are fixed to the inlet and outlet flanges such that the injection axis is parallel to the central axis.

These and other features of this application will be best understood from the following specification and drawings, the following of which is a brief description.

BRIEF DESCRIPTION OF THE DRAWINGS

FIG. 8 is example of another embodiment of a mixer having coaxial inlet and outlet modules.

FIG. 14 is an outlet end view of the mixer of FIG. 9.

FIG. 15 is perspective view of another example of a mixer.

FIG. 16 is a view similar to FIG. 15 but without the outer housing.

FIG. 17 shows a swirl pattern for the embodiment of FIG. 15.

DETAILED DESCRIPTION

Figure 1:
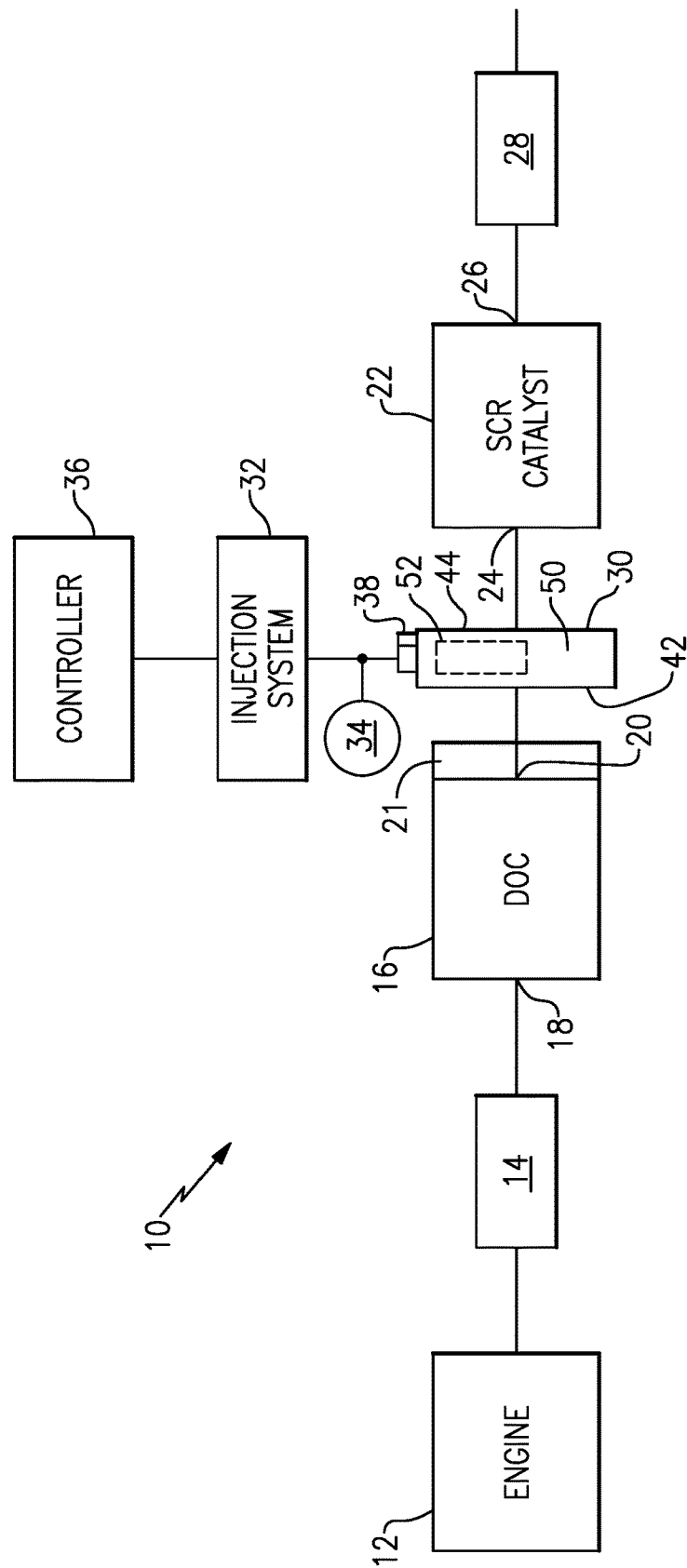
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known.

The mixer 30 comprises a mixer body having an inlet or upstream end 42 configured to receive the engine exhaust gases and an outlet or downstream end 44 to direct a mixture of swirling engine exhaust gas and products transformed from urea to the SCR catalyst 22. The mixer 30 defines an internal cavity 50 that receives engine exhaust gas and an injection component 52 is positioned within the internal cavity 50 to direct injected fluid into the internal cavity 50 to mix with the engine exhaust gas.

In one example configuration, an inlet module 46 (FIG. 2) has a module inlet 48 configured to receive engine exhaust gas. The injection component 52 defines an injection axis and includes an inner structure defining an inner gas flow path that concentrates injected fluid in a central region of the injection component 52 and an outer structure defining an outer gas flow path that is between the inner and outer structures and radially outward of the inner gas flow path. This will be discussed in greater detail below. An outlet module 58 has a module outlet 60 configured to direct a mixture of engine exhaust gas and fluid to a downstream exhaust component, for example the SCR catalyst 22.

Figure 2:
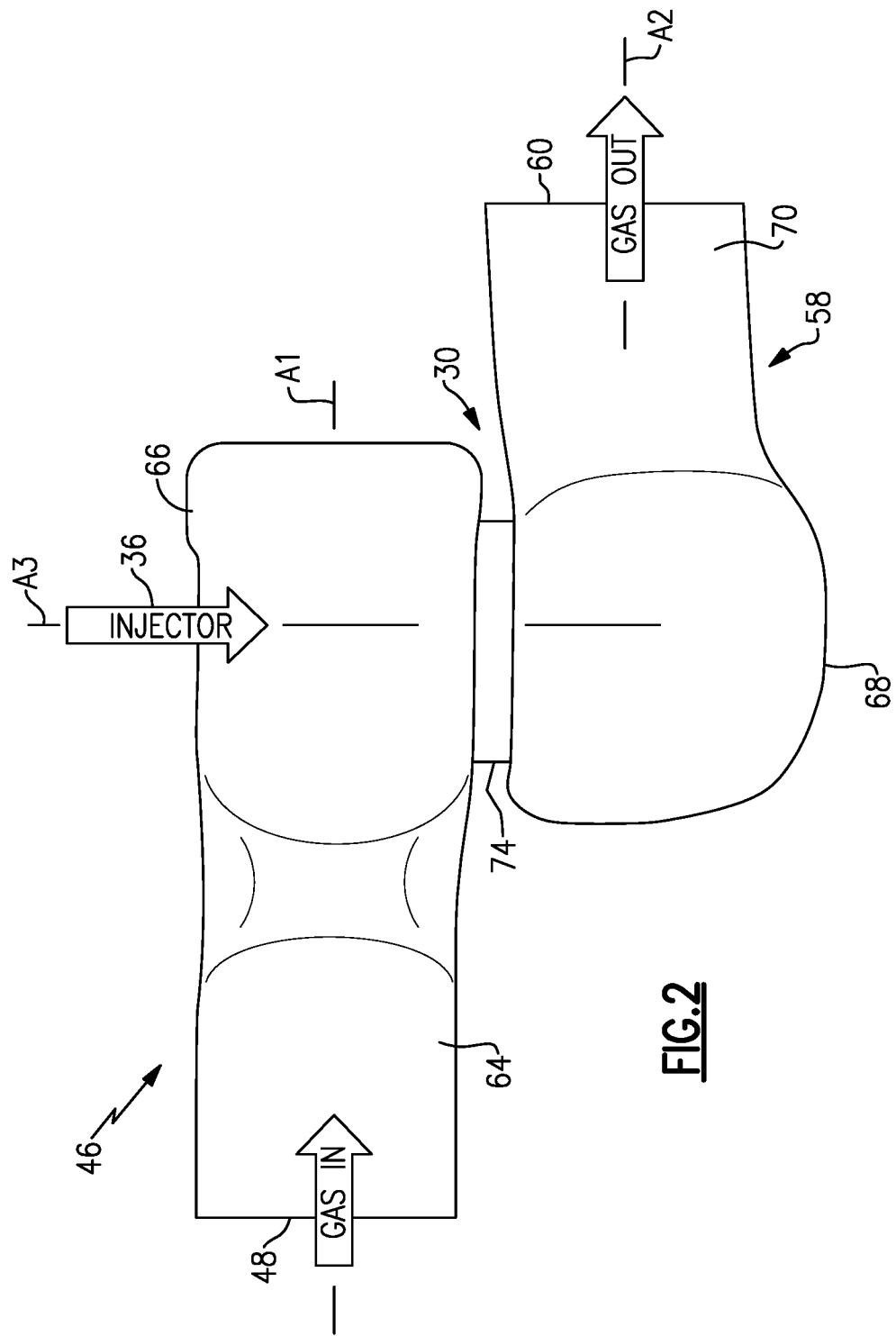
FIG. 2 is a side view of one example of a mixer having non-coaxial inlet and outlet modules.
Figure 3:
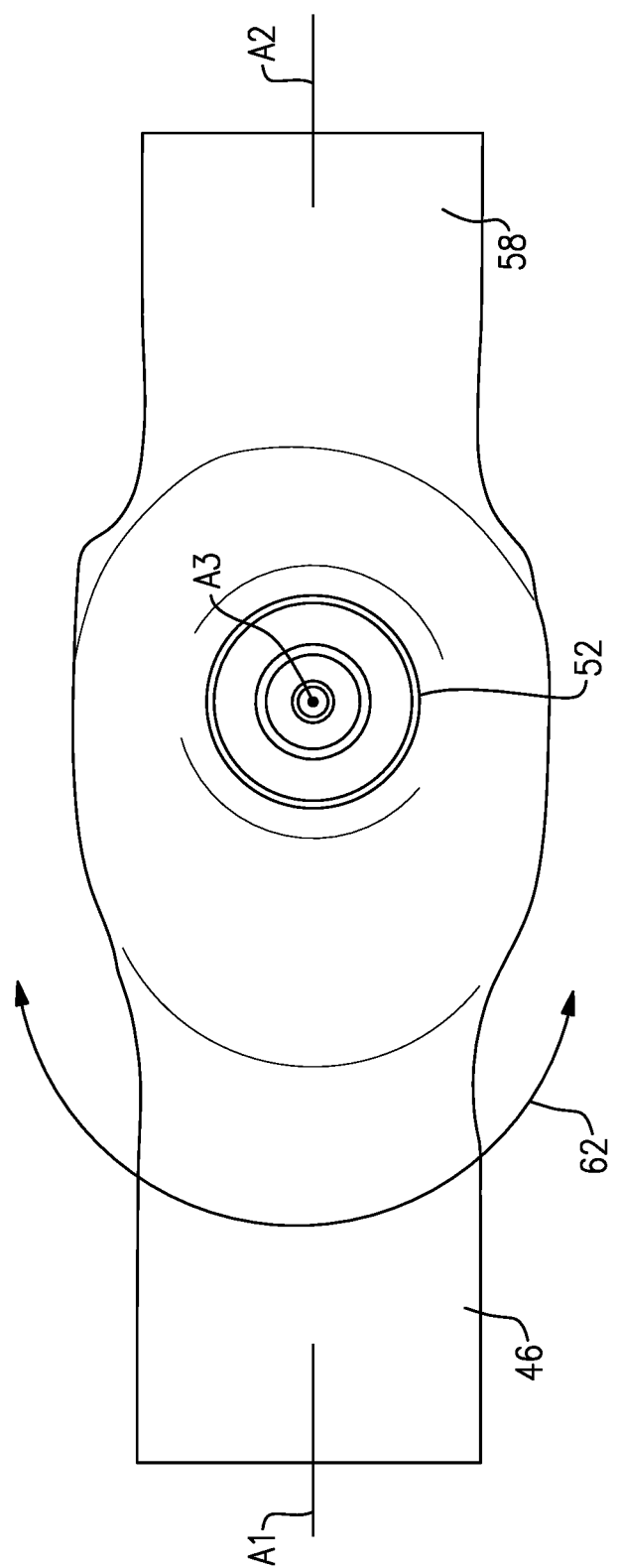
FIG. 3 is a top view of the mixer of FIG. 2.
Figure 4:
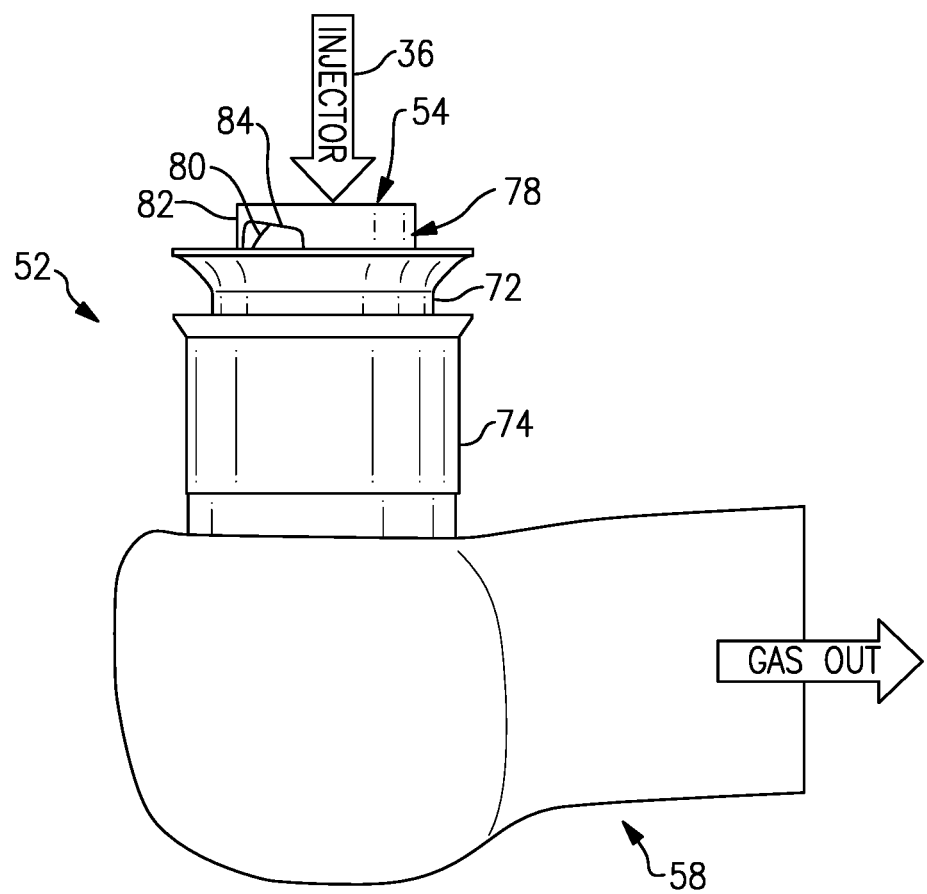
FIG. 4 is a side view of the mixer of FIG. 2 without the inlet module.
Figure 5:
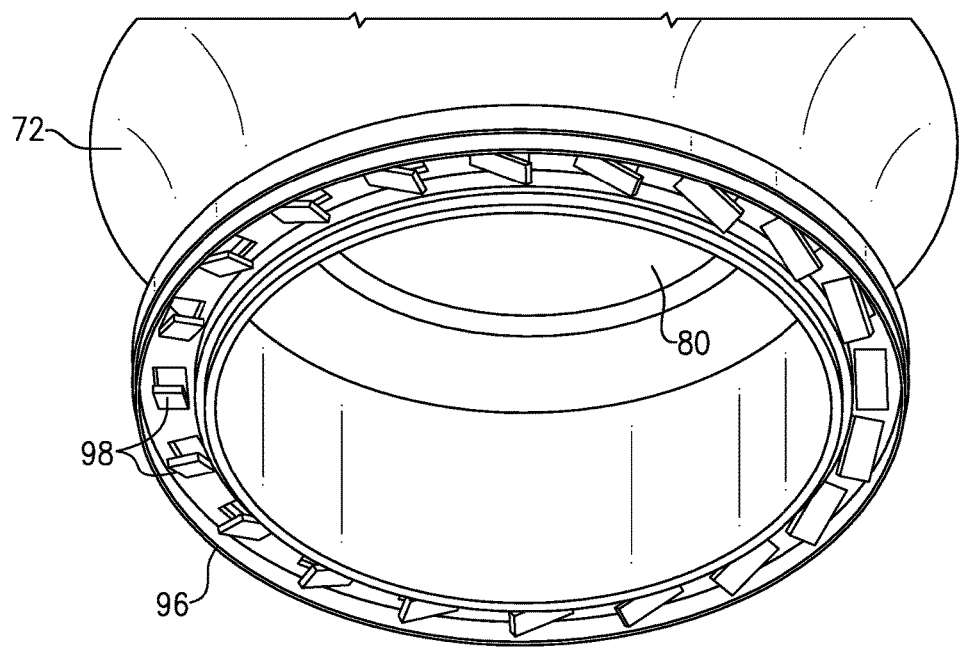
FIG. 5 is a perspective view of a mixing ring as used with the embodiment shown in FIG. 2.

FIGS. 2-7 shows a first example embodiment. FIG. 2 shows the inlet module 46 defining a first center axis A1 and the outlet module 58 defining a second center axis A2 that is parallel and spaced apart from the first center axis A1. The doser or injector 36, which injects fluid into the inlet module 46, defines an injection axis A3. In this example, the injection axis A3 is perpendicular to the first A1 and second A2 center axes. The relative orientation of the inlet 46 and the outlet 58 modules can be adjusted by rotation in order to match a desired layout configuration without any impact on the performance of the mixer 30 as indicated by the arrow 62 in FIG. 3. Further, the orientation of the injection axis A3 can also be varied as needed.

Figure 6:
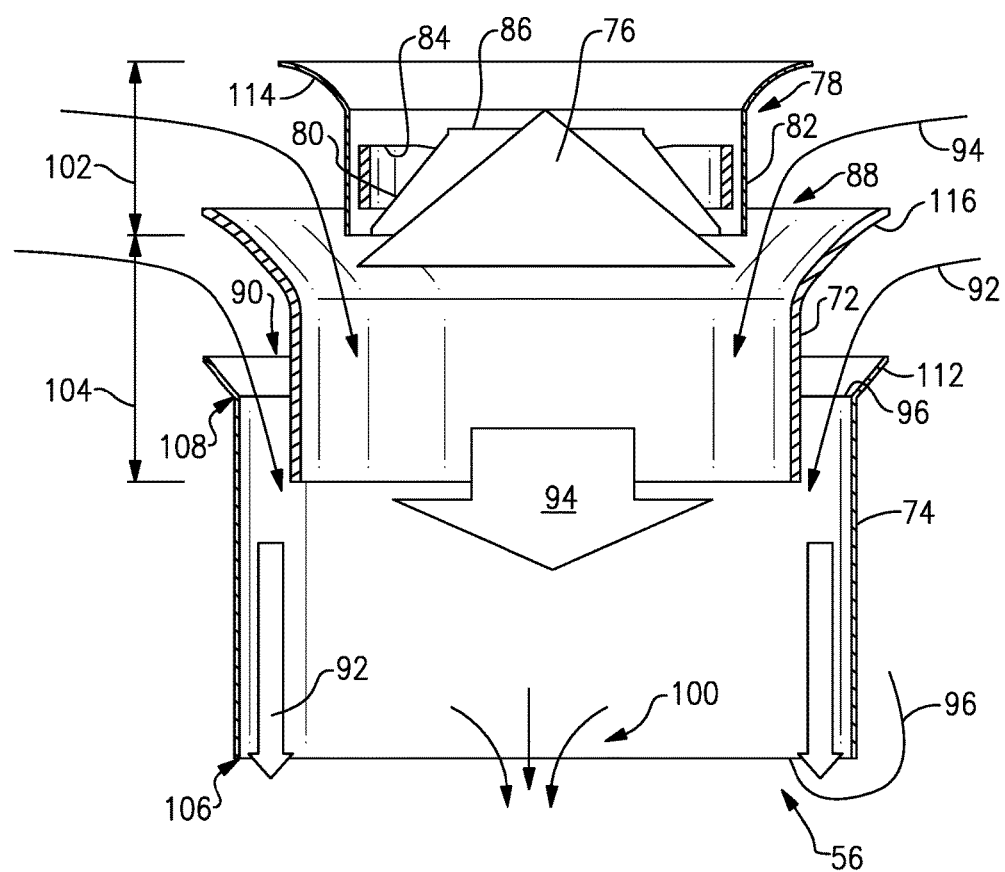
FIG. 6 is a side view of the injection component as used in the embodiment of FIG. 2.
Figure 7:
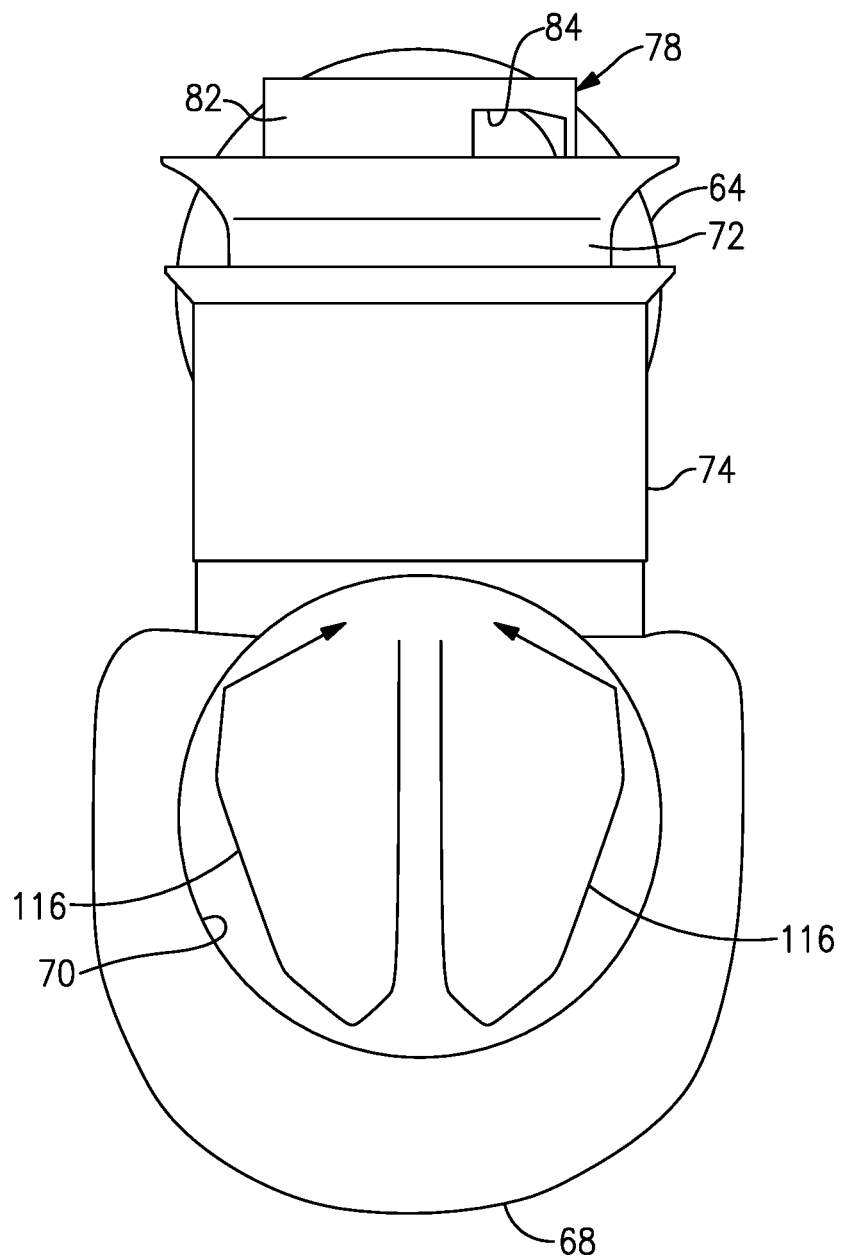
FIG. 7 is an end view of an outlet from the outlet module as used in the embodiment of FIG. 2.

In this example, the inlet module 46 comprises an outer housing with a straight inlet pipe portion 64 and an enclosed end portion 66, and the outlet module 58 comprises an enclosed end portion 68 and a straight outlet pipe portion 70. The injection component 52 comprises a mixer assembly that is mounted to the inlet module 46 and the flow is split between an inner pipe 72 and an outer pipes 74 (FIG. 4) to allow a good control of injected fluid spray 76 (FIG. 6) and of the temperature of the pipe walls. In this example, a swirl cone 78 is positioned radially inward of the inner pipe 72 and includes an inner cone 80 and an outer swirl manifold 82 with one or more openings 84 as shown in FIG. 6. The openings 84 are configured to direct exhaust gas flow into an inlet end 86 of the inner cone 80. The swirl cone 78 controls the spray and reduces the risk of deposit in the injection area by creating a swirling flow around the injected spray. In one example, the swirl manifold 82 includes two openings 84 that are diametrically positioned opposite of each other to generate a swirl flow.

A first gap 88 is provided between the outer surface of the swirl manifold 82 and the inner surface of the inner pipe 72.

A second gap 90 is provided between the outer surface of the inner pipe 72 and an inner surface of the outer pipe 74. The second gap 90 allows the creation of a gas layer or gas flow (indicated at arrow 92) on the outer pipe 74 to improve the evaporation of liquid film formed by spray impinging the wall and to control the temperature of the outer pipe 74. In order to adjust the evaporation, it is possible to modify the gap 90, e.g. radially increase or decrease the gap size, between the inner pipe 72 and the outer pipe 74 as needed. The swirl cone 78 directs flow toward a central region of the inner pipe 72. The first gap 88 allows gas flow 94 to concentrate the spray in the central region for mixing purposes. Thus, the gaps 88, 90 cooperate to control the behavior of the spray at the exit of the swirl cone 78 to improve mixing and reduce spray deposit formation. By using the inner 72 and outer 74 pipes to concentrate the flow around the swirl cone 78, the spray is controlled in the central area of the injection component 52.

The outer pipe 74 provides a single pipe connection to link the inlet module 46 to the outlet module 58 and to define the mixer internal cavity 50 that receives the injection component 52. This pipe 74 cooperates with the inner pipe 72 and swirl cone 78 to generate a flow mixture 100 of spray and exhaust gas exiting via the gaps 88, 90. The size of the pipe 74 (length and diameter) can be changed to adapt to a mass flow delivered by the engine 12 as well as a pressure drop target. Further, the relative positions of the swirl cone 78 versus the inner 72 and outer 74 pipes (as indicated at 102, 104 in FIG. 6) are adjustable in order to modulate the pressure drop of the system and the quantity of flow in the swirl cone 78 and between the pipes 72, 74.

In one example, a mixing ring 96 (FIG. 5) is located between the inner 72 and outer 74 pipes. The mixing ring 96 includes a plurality of tabs or louvers 98 that providing a plurality of openings in the ring to control exhaust gas flow through the second gap 90. The louvers 98 are configured to generate a swirling gas curtain within the second gap 90. In one example, the louvers 98 extend to distal ends that protrude outwardly from a downstream side of the mixing ring 96. This creates a plurality of openings that are circumferentially spaced apart from each other about the ring 96. In one example, the mixing ring 96 can be located at a downstream end of the gap 90 as indicated at 106 in FIG. 6. In another example, the mixing ring 96 can be located near an upstream end of the gap 90 at a location that is upstream from the outlet of the inner pipe 72 as indicated at 108 in FIG. 6. These mixing rings 96 can be used either alone or in combination with each other.

In one example, the inner tube 72 includes a flared portion 110 that provides for an increased area at the inlet end of the inner tube 72. The outer tube 74 also includes a flared portion 112 that provides for an increased area at the inlet end of the outer tube 74. The swirl manifold 82 may also include a flared portion 114. The flared portions 110, 112, 114 facilitate and control the exhaust gas flow into the cone 80 and gaps 88, 90.

The outlet module 58 is where a majority of the mixing occurs. This outlet module 58 also receives any remaining spray, which was not evaporated in the injection component 52 and will evaporate it. In one example, the outlet module 58 comprises a spherical or elongated concave shape of the enclosed end portion 68 that limits the pressure drop as well as initiating turbulence to improve the mixing. This specific shape generates a double swirl at the outlet of the outlet model 58 to further improve the mixing as indicated at 116 in FIG. 7.

FIGS. 8-14 show another example embodiment for a compact mixer configuration. In this example, a mixer 120 includes an outer housing 122, an inlet baffle 124, an outlet baffle 126, and an injection component 128. As shown in FIG. 8, a first volume 130 in the mixer 120 comprises an inlet module and a second volume 132 comprises an outlet module.

Figure 10:
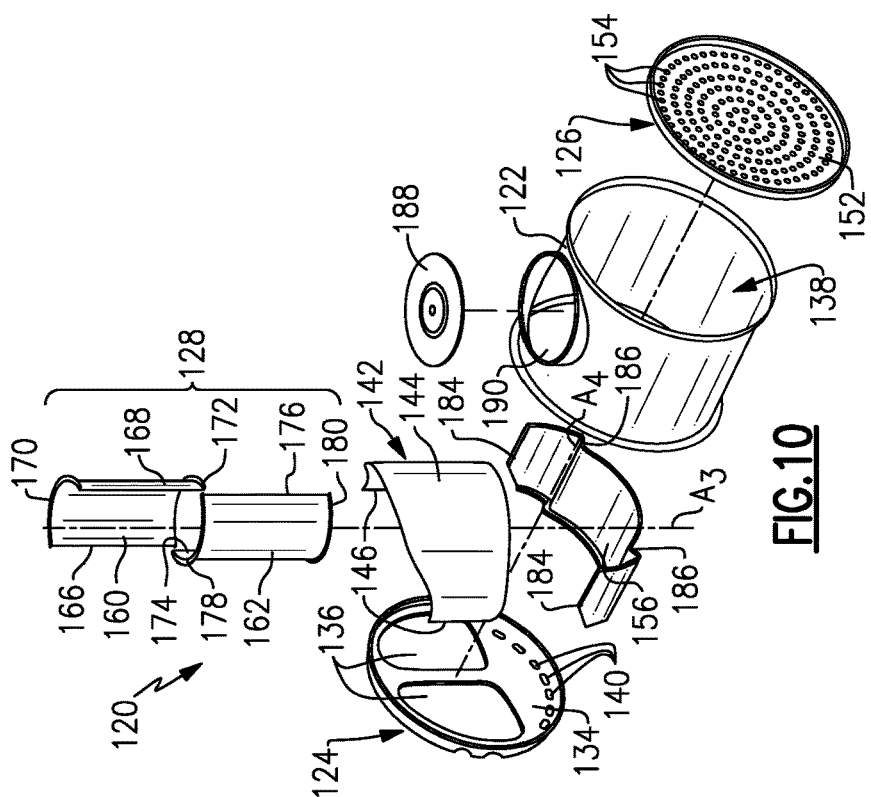
FIG. 10 is an exploded view of the mixer of FIG. 8 as viewed from an opposite side of the mixer.
Figure 9:
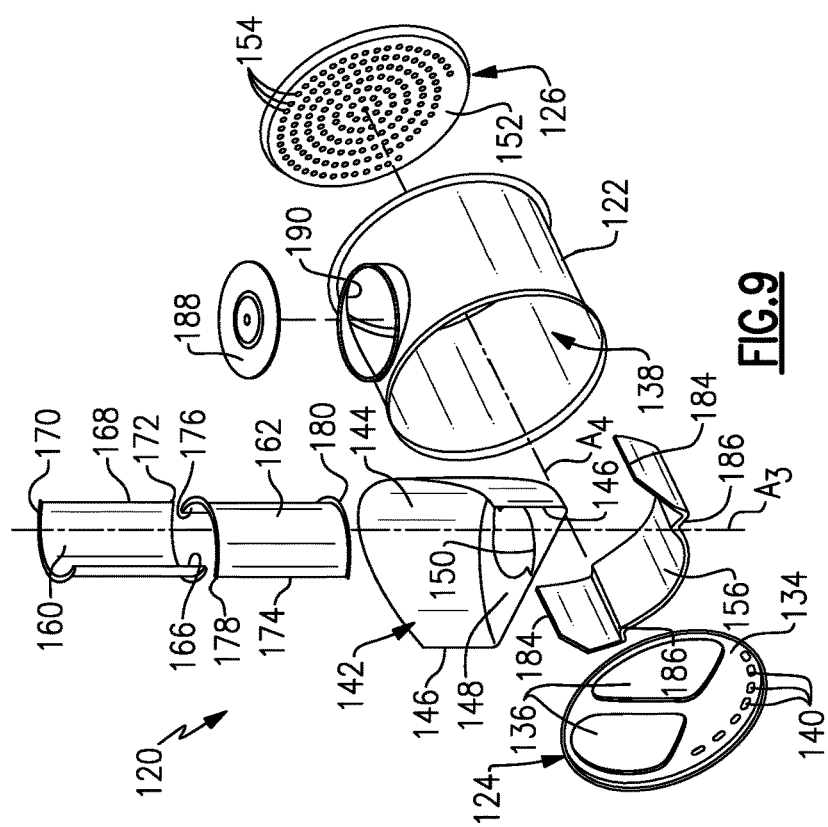
FIG. 9 is an exploded view of the mixer of FIG. 8 as viewed from one side of the mixer.

FIGS. 9-10 show an exploded view of the mixer 120. The inlet baffle 124 comprises a plate 134 extending across an upstream end of the mixer housing 122 and which has at least one primary opening 136 (two primary openings are shown in FIGS. 9-10) through which a major portion of the exhaust gas enters an internal cavity 138 and a plurality of secondary openings 140 through which a remaining portion of the exhaust gas enters the internal cavity 138.

An inlet manifold 142 is enclosed within the mixer housing 122 and comprises a manifold wall 144 that at least partially extends around the injection component 128, which surrounds the injection axis A3. In one example, the manifold wall 144 comprises a curved surface that extends to distal opposing edges 146. The inlet manifold 142 also includes a flat wall portion 148 that extends between the edges 146. The flat wall portion 148 includes an opening 150 that is associated with a downstream end of the injection component 128. In one example, the flat wall portion 148 comprises a C-shaped flat plate that includes the opening 150. The first volume 130 is formed underneath the inlet baffle 124 and above the inlet manifold 142, and this first volume 130 comprises the inlet module.

The outlet baffle 126 comprises a plate 152 extending across a downstream end of the mixer housing 122. The plate 152 includes a plurality of openings 154 through which a mixture of fluid and exhaust gas exits the mixer housing 122. An inner wall 156 is positioned within the mixer housing 122 to face an outlet end of the injection component 128. The second volume 132 is formed between the inlet manifold 142, the inlet baffle 124, the inner wall 156, and the outlet baffle 126. The second volume 132 comprises the outlet module.

In one example, the injection component 128 comprises at least a first curved sheet 160 and a second curved sheet 162 that cooperate with each other to surround the injection axis, and wherein the second curved sheet is offset from the first curved sheet 160 by a radial gap 164 (FIG. 12) to create a swirling gas flow within the injection component 128 to mix with fluid injected via a fluid inlet into the injection component 128. In one example, the first curved sheet 160 comprises a first curved body that extends at least partially about the injection axis A3 from a first longitudinally extending edge 166 to a second longitudinally extending edge 168. The first curved sheet 160 also includes a first circumferentially extending edge 170 and a second circumferentially extending edge 172 that is axially spaced from the first circumferentially extending edge 170. The first 166 and second 168 longitudinally extending edges connect the first 170 and second 172 circumferentially extending edges to each other.

In one example, the second curved sheet 162 comprises a second curved body that extends at least partially about the injection axis A3 from a third longitudinally extending edge 174 to a fourth longitudinally extending edge 176. The second curved sheet 162 also includes a third circumferentially extending edge 178 and a fourth circumferentially extending edge 180 that is axially spaced from the third circumferentially extending edge 176. The third 174 and fourth 176 longitudinally extending edges connect the third 178 and fourth 180 circumferentially extending edges to each other. In one example, the first 166 and third 174 longitudinally extending edges are radially aligned with each other and the second 168 and fourth 176 longitudinally extending edges are radially aligned with each other. In one example, the first 166 and third 174 longitudinally extending edges are radially spaced apart from each other in an overlapping relationship on one side of the injection axis A and the second 168 and fourth 176 longitudinally extending edges are radially spaced apart from each other in an overlapping relationship on an opposite side of the injection axis A3. This offset and overlapping relationship generates a swirling flow pattern that concentrates the spray in a central region of the injection component 128 for mixing purposes. Further, this configuration improves mixing of the injected fluid and exhaust gas, and additionally reduces spray deposit formation.

In one example, the first 160 and second 162 curved sheets comprise C-shaped sheets that are radially offset from each other. The C-shape could also comprise a U-shape, parabolic shape, or any other curved profile. Further, the first 160 and second 162 curved sheets could also include openings or perforations.

The first 160 and second 162 curved sheets comprise independent deflecting members that are separate from each other, i.e. they are not welded or assembled directly together. Each of the sheets 160, 162 presents a curved profile. In one example, the profile has a first portion that is a constant radius and a second portion that has a non-constant radius.

Figure 13:
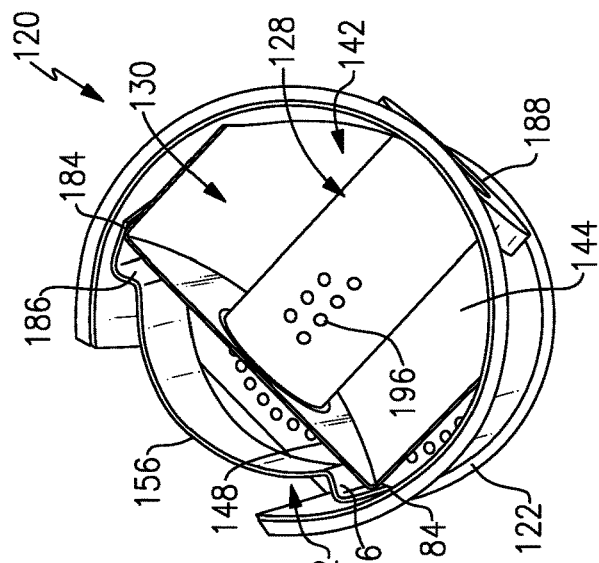
FIG. 13 is an inlet end view of the mixer of FIG. 9 without the inlet baffle.
Figure 12:
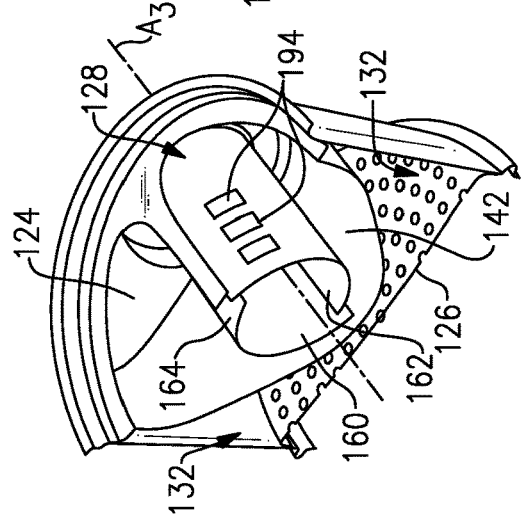
FIG. 12 is a section view of FIG. 11.
Figure 11:
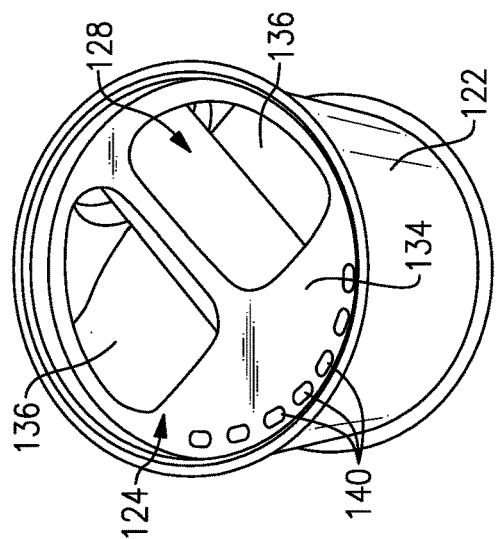
FIG. 11 is an inlet end view of the mixer of FIG. 9.

FIGS. 11-13 show an inlet end of the mixer 120 in greater detail. The first volume 130 of the mixer 120 is shown in FIG. 13 and the second volume 132 is shown in FIG. 12. As shown in FIG. 11, the primary opening(s) 136 overlap a significant portion of the injection component 128 to direct exhaust gas into the radial gap 164 which extends along an axial length of the injection component 128, and which can be referred to as a trough gap. In one example, the primary opening 136 comprises a pair of large openings that are separated by an axially extending flat strip that extends from one edge of the plate 134 in a direction toward the secondary openings 140, which are located on an opposite edge of the plate 134.

As shown in FIG. 13, the inner wall 156 is spaced radially inward from an inner surface of the housing 122 by a gap 182. The secondary openings 140 direct exhaust gas into this gap 182 to heat the inner wall 156 to reduce spray deposit formation. The inlet manifold 142 has an outer surface that is fixed to an inner surface of the housing 122 and/or the inner wall 156. The inner wall 156 includes a pair of opposing distal edges 184 that are fixed to the inlet manifold 142 and/or mixer housing 122. A step portion 186 extends radially inwardly from each distal edge 184 such that the main portion of the inner wall 156 is spaced from the housing 122 to provide the gap 182.

FIG. 14 shows an outlet end of the mixer 120 as assembled. FIG. 14 shows an end view of the outlet baffle 126 with the plurality of exit openings 154 formed in the plate 152. In one example, the openings 154 are circumferentially spaced apart from each outer about a mixer central axis A4 and form a series of circular row patterns that are spaced radially apart from each other relative to the mixer central axis A4.

In the example shown in FIGS. 8-14, the mixer 120 comprises a compact mixer configuration with the inlet baffle 124 defining the inlet axis A1 and the outlet baffle 126 defining the outlet axis A2. In this example, the inlet A1 and outlet A2 axes are coaxial with the mixer central axis A4 and are non-coaxial with the injection axis A3. The first 160 and second 162 curved sheets each extend at least partially about the injection axis A3. The inlet ends of the first 160 and second 162 curved sheets are fixed to an inlet flange 188 (FIG. 13) that covers an opening 190 formed in the outer housing 122 that is associated with the injector 36 (FIG. 1). The outlet ends of the first 160 and second 162 curved sheets are fixed to the flat wall portion 148 of the inlet manifold 142 (FIG. 13).

In one example, the curved sheets 160, 162 includes ribs 194 (FIG. 12) to increase the durability of the sheets. In another example, the curved sheets 160, 162 include one or more perforations 196 to further facilitate the swirling flow. Further, the curved sheets 160, 162 can have linear or nonlinear profiles along the doser axis. In one example, the sheets can be defined by a constant radius, while in another example the sheets are defined by a varying radius along the doser axis.

In another example configuration, the curved sheets 160, 162, can be used in the configuration as shown in FIGS. 4-7.

FIGS. 15-18 disclose another example configuration of a mixer 200. In this example, the mixer 200 includes an outer housing 202, an inlet 204, and an outlet 206. In one example, the inlet 204 comprises a duct that is attached to an outer peripheral surface 208 of the outer housing 202. The outer housing 202 extends from a first end 210 to a second end 212. In one example, the inlet 204 is connected to the housing 202 adjacent to the first end 210 and the outlet 206 comprises a pipe that is connected to the second end 212. An inlet flange 214 closes the first end 210 of the housing 202 and an outlet flange 216 closes the second end 212 of the housing 202.

An injection component 218 is located within an internal cavity 220 of the housing 202. In one example, the injection component 218 comprises first 222 and second 224 curved sheets. The first 222 and second 224 curved sheets are configured similar to that described above with regard to FIGS. 8-14. In one example, the inlet ends 226 of the sheets 222, 224 are fixed to the inlet flange 214 and the outlet ends 228 of the sheets 222, 224 are fixed to the outlet flange 216; however, other direct and indirect mounting arrangements could also be used. The inlet flange 214 includes a doser boss 230 that mounts the injector 36 to the mixer 200 to define the injection axis A3. The outlet flange 216 includes an opening 232 through which the outlet pipe 206 extends to connect to a downstream exhaust component. In this configuration, the outlet axis A2, the injection axis A3, and the mixer central axis A4 are coaxial. The injection axis A1 is non-coaxial with the outlet axis A2, the injection axis A3, and the mixer central axis A4.

Figure 18:
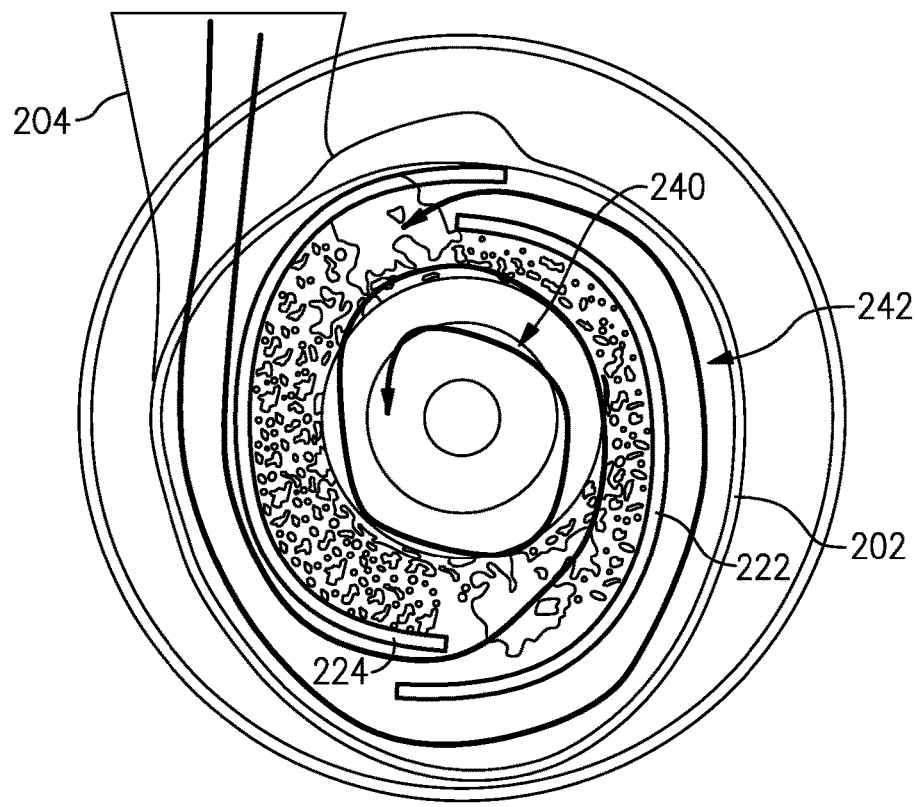
FIG. 18 shows a swirl pattern of an inlet module of the embodiment of FIG. 15.

FIGS. 17-18 show the swirling flow pattern that is generated by the first 222 and second 224 curved sheets. As shown, there is an internal flow area 240 between the sheets 222, 224 and an external flow area 242 between the sheets 222, 224 and the housing 202. Each of the flow areas generate a swirling effect to the exhaust gas entering via the inlet 204. The flow path provides a symmetric condition for swirl generation that improves co-axility of the swirl vortex axis and injection axis A3. This avoids concentrated impingement on the first 222 and second 224 curved sheets when using sprayed reducing agent.

The subject invention provides a mixing configuration that generates a swirling exhaust flow to ensure thorough mixing of injected fluid with the exhaust gas prior to exiting the mixer. The offset double curved sheet configuration facilitates more efficient heat distribution to provide consistent temperature distribution along the injection path and to maintain the injection component at a high temperature to avoid deposit formation.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component assembly comprising:
an inlet configured to receive engine exhaust gas;
a mixer housing defining an internal cavity that receives engine exhaust gas from the inlet;
an injection component defining an injection axis and positioned within the internal cavity, the injection component having a fluid inlet and a fluid outlet to direct injected fluid into the internal cavity to mix with the engine exhaust gas, and wherein the injection component comprises at least a first curved sheet and a second curved sheet that cooperate with each other to surround the injection axis, and wherein the second curved sheet is offset from the first curved sheet by a radial gap to create a swirling gas flow within the injection component to mix with fluid injected via the fluid inlet; and
an outlet to direct a mixture of engine exhaust gas and injected fluid to a downstream exhaust component.

2. The vehicle exhaust component assembly according to claim 1, wherein the first curved sheet comprises a first curved body that extends at least partially about the injection axis from a first longitudinally extending edge to a second longitudinally extending edge, and wherein the second curved sheet comprises a second curved body that extends at least partially about the injection axis from a third longitudinally extending edge to a fourth longitudinally extending edge, and wherein the first and third longitudinally extending edges are radially spaced apart from each other in an overlapping relationship on one side of the injection axis and the second and fourth longitudinally extending edges are radially spaced apart from each other in an overlapping relationship on an opposite side of the injection axis.

3. The vehicle exhaust component assembly according to claim 2, wherein the mixer housing extends from an upstream end to a downstream end and defines a mixer central axis that is non-parallel with the injection axis, and wherein the inlet and outlet are coaxial with the mixer central axis.

4. The vehicle exhaust component assembly according to claim 3, including an inlet baffle and an inlet manifold, the inlet baffle comprising a plate extending across the upstream end of the mixer housing and having at least one primary opening through which a major portion of the exhaust gas enters the internal cavity and a plurality of secondary openings through which a remaining portion of the exhaust gas enters the internal cavity, and wherein the inlet manifold is enclosed within the mixer housing and comprises a manifold wall that at least partially extends around the first and second curved sheets.

5. The vehicle exhaust component assembly according to claim 4, wherein the inlet manifold includes a flat wall portion with an opening associated with downstream ends of the first and second curved sheets.

6. The vehicle exhaust component assembly according to claim 5, including
an outlet baffle comprising a plate extending across the downstream end of the mixer housing and having a plurality of openings through which a mixture of fluid and exhaust gas exits the mixer housing, and
an inner wall positioned within the mixer housing to face the fluid outlet of the injection component.

7. The vehicle exhaust component assembly according to claim 6, wherein the inner wall is spaced from an inner surface of the mixer housing by a flow gap, and wherein the inner wall comprises a curved surface that faces the flat wall portion.

8. The vehicle exhaust component assembly according to claim 2, wherein the mixer housing extends from an upstream end to a downstream end and defines a mixer central axis that is parallel with the injection axis.

9. The vehicle exhaust component assembly according to claim 8, wherein the inlet comprises an inlet duct defining an inlet axis that is non-coaxial with the mixer central axis, the inlet duct being attached to an outer peripheral surface of the upstream end of the mixer housing, and wherein the outlet comprises an outlet pipe defining an outlet axis that is coaxial with the mixer central axis, the outlet pipe connected to the downstream end of the mixer housing.

10. The vehicle exhaust component assembly according to claim 8, including an inlet flange enclosing the upstream end of the mixer housing and an outlet flange enclosing the downstream end of the mixer housing, and wherein inlet edges of the first and second curved sheets are fixed to the inlet flange and outlet edges of the first and second curved sheets are fixed to the outlet flange.

11. The vehicle exhaust component assembly according to claim 10, wherein the inlet flange includes a boss configured to receive an injector to inject fluid into the mixer housing.

12. A vehicle exhaust component assembly comprising:
an inlet;
a mixer housing receiving engine exhaust gas from the inlet;
an injector component to inject fluid into the mixer housing along an injection axis, the injector component including at least first and second curved sheets that cooperate with each other to surround the injection axis, and wherein each curved sheet has first and second circumferentially extending edges that are axially spaced apart from each other, and first and second longitudinally extending edges that connect the first and second circumferentially extending edges to each other, and wherein the first and second longitudinally extending edges of the first curved sheet are radially offset from the first and second longitudinally extending edges of the second curved sheet; and
an outlet to direct a mixture of engine exhaust gas and fluid to a downstream exhaust component.

13. The vehicle exhaust component assembly according to claim 12, wherein the first longitudinally extending edges of the first and second curved sheets are radially aligned with each other or overlapping with each other, and wherein the first longitudinally extending edges of the first and second curved sheets are radially spaced apart from each other on one side of the injection axis, and wherein the second longitudinally extending edges of the first and second curved sheets are radially aligned with each other or overlapping with each other, and wherein the second longitudinally extending edges of the first and second curved sheets are radially spaced apart from each other on an opposite side of the injection axis.

14. The vehicle exhaust component assembly according to claim 12, wherein the first and second curved sheets comprise C-shapes, and wherein at least one of the first and second curved sheets includes at least one rib and/or perforation.

15. The vehicle exhaust component assembly according to claim 12, including a first plate attached to the first circumferentially extending edges of the first and second curved sheets and a second plate attached to the second circumferentially extending edges of the first and second curved sheets, and wherein the first plate includes an opening associated with the injector component to direct fluid into an area between the first and second curved sheets, and wherein the second plate includes an opening through which a swirling mixture of fluid and engine exhaust gas exits the first and second curved sheets.

16. The vehicle exhaust component assembly according to claim 15, including an inlet baffle attached to an upstream end of the mixer housing, an outlet baffle attached to a downstream end of the mixer housing, and an inlet manifold positioned within the mixer housing between the inlet and outlet baffle, and wherein the second plate is formed as part of the inlet manifold.

17. A vehicle exhaust component assembly comprising:
an inlet;
a mixer device configured to receive engine exhaust gas from the inlet, wherein the mixer device includes an injector opening defining an injection axis;
at least first and second C-shaped sheets that cooperate with each other to surround the injection axis, and wherein the second C-shaped sheet is radially offset from the first C-shaped sheet to provide a swirling mixing area between the first and second C-shaped sheets for injected fluid to mix with the engine exhaust gas; and
an outlet to direct a mixture of engine exhaust gas and injected fluid to a downstream exhaust component.

18. The vehicle exhaust component assembly according to claim 17, including an injector mounted at the injector opening to inject fluid along the injection axis, and wherein each C-shaped sheet has first and second longitudinally extending edges that extend along the injector axis, and wherein the first longitudinally extending edges of the C-shaped sheets are in radial alignment or overlapping with each other and radially spaced apart from each other on one side of the injection axis, and wherein the second longitudinally extending edges of C-shaped sheets are in radial alignment or overlapping with each other and are radially spaced apart from each other on an opposite side of the injection axis.

19. The vehicle exhaust component assembly according to claim 17, wherein the mixer device includes an outer housing defining a mixer central axis and extending from an upstream end to a downstream end, and including an inlet baffle plate at the upstream end, an outlet baffle plate at the downstream end, and an inlet manifold positioned between the inlet and outlet baffle plates, and wherein the first and second C-shaped sheets are positioned between the inlet baffle plate and the inlet manifold such that the injection axis is non-parallel with the mixer central axis.

20. The vehicle exhaust component assembly according to claim 17, wherein the mixer device includes an outer housing defining a central axis and extending from an upstream end to a downstream end, and including an inlet flange with the injector opening at the upstream end, an outlet flange at the downstream end, and wherein the first and second C-shaped sheets are fixed to the inlet and outlet flanges such that the injection axis is parallel to the central axis.

21. The vehicle exhaust component assembly according to claim 18, wherein the first and second longitudinally extending edges extend in a direction that is parallel to the injection axis.

22. The vehicle exhaust component assembly according to claim 17, wherein the first C-shaped sheet surrounds a first portion of the injection axis and the second C-shaped sheet surrounds a remaining portion of the injection axis.

23. The vehicle exhaust component assembly according to claim 2, wherein the first, second, third, and fourth longitudinally extending edges extend in a direction that is parallel to the injection axis.

24. The vehicle exhaust component assembly according to claim 1, wherein the first curved sheet surrounds a first portion of the injection axis and the second curved sheet surrounds a remaining portion of the injection axis.

25. The vehicle exhaust component assembly according to claim 13, wherein the first and second longitudinally extending edges extend in a direction that is parallel to the injection axis.

26. The vehicle exhaust component assembly according to claim 12, wherein the first curved sheet surrounds a first portion of the injection axis and the second curved sheet surrounds a remaining portion of the injection axis.

* * * * *